United States Patent
Korenaga et al.

(10) Patent No.: US 8,441,728 B2
(45) Date of Patent: May 14, 2013

(54) DIFFRACTIVE LENS AND IMAGE PICKUP DEVICE USING THE SAME

(75) Inventors: Tsuguhiro Korenaga, Osaka (JP); Takamasa Ando, Osaka (JP)

(73) Assignee: Panasonic Corporation, Osaka (JP)

( * ) Notice: Subject to any disclaimer, the term of this patent is extended or adjusted under 35 U.S.C. 154(b) by 370 days.

(21) Appl. No.: 13/000,430

(22) PCT Filed: Dec. 18, 2009

(86) PCT No.: PCT/JP2009/007033
§ 371 (c)(1),
(2), (4) Date: Dec. 21, 2010

(87) PCT Pub. No.: WO2010/073573
PCT Pub. Date: Jul. 1, 2010

(65) Prior Publication Data
US 2011/0102898 A1  May 5, 2011

(30) Foreign Application Priority Data
Dec. 26, 2008  (JP) .................................. 2008-335115

(51) Int. Cl.
G02B 5/18 (2006.01)
(52) U.S. Cl.
USPC .......................... 359/570; 359/571; 359/575
(58) Field of Classification Search .......... 359/566–576, 359/558–559, 563, 565, 642–830; 356/305, 356/328, 334, 448, 494, 499, 521; 385/37; 428/167
See application file for complete search history.

(56) References Cited

U.S. PATENT DOCUMENTS

| | | | |
|---|---|---|---|
| 4,881,805 A * | 11/1989 | Cohen | 359/571 |
| 5,847,877 A | 12/1998 | Imamura et al. | |
| 6,166,854 A * | 12/2000 | Katsuma | 359/569 |
| 2001/0043397 A1 | 11/2001 | Ishii | |
| 2006/0109568 A1* | 5/2006 | Chen | 359/708 |

(Continued)

FOREIGN PATENT DOCUMENTS

| JP | 09-127321 A | 5/1997 |
|---|---|---|
| JP | 2007-291291 A | 11/2007 |

(Continued)

OTHER PUBLICATIONS

International Search Report for corresponding International Application No. PCT/JP2009/007033 dated Feb. 2, 2010.
Form PCT/IPEA/409 for corresponding International Application No. PCT/JP2009/007033 dated Jul. 16, 2010.

*Primary Examiner* — Stepone Allen
*Assistant Examiner* — Jeffrey Madonna
(74) *Attorney, Agent, or Firm* — Renner, Otto, Boisselle & Sklar, LLP

(57) ABSTRACT

A diffractive lens 11 that includes: a lens base 18, which has a second surface 13 with first and second groups of diffraction grating portions 20 and 21; and a protective coating 17, which is arranged on the first group of diffraction grating portions 20. The first group of diffraction grating portions 20 has a first group of diffraction steps and the second group of diffraction grating portions 21 has a second group of diffraction steps, which is lower in height than the first group of diffraction steps. One of the respective materials of the base 18 and the protective coating 17 has a higher refractive index and a greater Abbe number than the other material. And the second group of diffraction steps is not covered with the protective coating 17.

8 Claims, 8 Drawing Sheets

U.S. PATENT DOCUMENTS

| | | |
|---|---|---|
| 2008/0049587 A1 | 2/2008 | Hayashi et al. |
| 2009/0225215 A1 | 9/2009 | Korenaga et al. |
| 2010/0087921 A1* | 4/2010 | Simpson ................. 359/570 |
| 2011/0134737 A1* | 6/2011 | Komma ................. 369/47.49 |
| 2012/0008210 A1* | 1/2012 | Korenaga et al. ............. 359/570 |

FOREIGN PATENT DOCUMENTS

| | | |
|---|---|---|
| JP | 2008-52787 A | 3/2008 |
| JP | 2008-058909 A | 3/2008 |
| JP | 2008-191299 A | 8/2008 |
| WO | 2007/132787 A1 | 11/2007 |

* cited by examiner

CHROMATIC ABERRATION
(SPHERICAL ABERRATION CHART)

FIELD CURVATURE
(ASTIGMATISM CHART)

ANGLE OF INCIDENCE θ = 0°

(a) WITH PROTECTIVE COATING (b) WITHOUT PROTECTIVE COATING

ANGLE OF INCIDENCE θ = 5°

(a) WITH PROTECTIVE COATING (b) WITHOUT PROTECTIVE COATING

ANGLE OF INCIDENCE θ = 10°

(a) WITH PROTECTIVE COATING (b) WITHOUT PROTECTIVE COATING

DIFFRACTIVE LENS AND IMAGE PICKUP DEVICE USING THE SAME

TECHNICAL FIELD

The present invention relates to a diffractive lens that realizes high resolution in a wide angle range by minimizing production of unnecessary diffracted light and loss of light, and also relates to an image capture device that uses such a lens.

BACKGROUND ART

A diffractive lens, which has a concentric diffraction grating portion on the surface of an aspheric lens, is known as a lens that would realize higher image capturing performance than an aspheric lens. By achieving not just the refraction effect of an aspheric lens but also diffraction effect, a diffractive lens can reduce significantly various kinds of aberrations such as chromatic aberration and field curvature. Particularly with a diffraction grating portion, of which the cross section is either blazed or consisting of fine steps that are inscribed to each other in a blazed pattern, the diffraction efficiency of a particular order with respect to a single wavelength can be increased to almost 100%.

Suppose a blazed diffraction grating portion 92 has been formed on the surface of a base 91 with a refractive index n(λ) as shown in FIG. 9. The diffraction step d of a diffraction grating portion, of which the $m^{th}$-order diffraction efficiency (where m is an integer) becomes 100% theoretically with respect to a light ray 93 that has been incident thereon perpendicularly with a wavelength λ, is calculated by the following Equation (1):

$$d=m\lambda/(n(\lambda)-1) \quad (1)$$

where the refractive index n(λ) indicates that the refractive index is a function of wavelength.

As can be seen from this Equation (1), as the wavelength λ varies, the d value that makes the $m^{th}$-order diffraction efficiency 100% also varies. Although the diffraction efficiency is supposed to be of the first-order (i.e., m=1) in the following example, m is not always one.

FIG. 10 shows the first-order diffraction efficiency of a light ray that has been incident perpendicularly onto a diffraction grating portion of polycarbonate that has a diffraction step of 0.93 μm. Since the diffraction step d of the diffraction grating portion has been determined by substituting a wavelength of 550 nm into Equation (1), the diffraction efficiency of the first-order diffracted ray becomes almost 100% at a wavelength of 550 nm. The first-order diffraction efficiency has wavelength dependence, and therefore, decreases to approximately 50% at a wavelength of 400 nm. Once the first-order diffraction efficiency has declined from 100%, unnecessary diffracted rays, including zero-order, second-order and minus-first-order ones, are produced.

However, if light falling within the entire visible radiation range (i.e., in the wavelength range of 400 nm through 700 nm) is made to be incident on an aspheric diffractive lens, on which a diffraction grating portion such as the one shown in FIG. 9 has been formed concentrically, the resultant color image will have a lot of noticeable flare. Such a flare is caused by unnecessary diffracted rays other than the first-order one that should be used for producing a subject image. Among other things, the bigger the difference in luminance between the subject and the background, the more noticeable the flare will be.

When such a flare is produced, the diffraction grating shown in FIG. 9 can be used to capture an image in only limited situations. Specifically, in that case, the diffraction grating can be used only when the luminance of a subject to shoot is not as high as that of the background or when the resolution does not have to be high, for instance. That is why it cannot be said that the conventional technique has fully developed the potential of a diffraction grating, of which the image capturing performance could be much higher than that of an aspheric lens, were it used more appropriately.

To produce a color image with little flare using such a diffractive lens, somebody proposed a technique for reducing the wavelength dependence of the diffraction efficiency of a particular order (see Patent Document No. 1, for example). FIG. 11 illustrates a diffractive optical element as disclosed in Patent Document No. 1, which teaches applying and bonding a protective coating 113 that covers a diffraction grating portion 112 on a base 111. In that case, the diffraction step d' of the diffraction grating portion that makes 100% the first-order diffraction efficiency of a light ray striking the diffraction grating portion 112 perpendicularly (i.e., at an angle of incidence θ of zero degrees) is given by the following Equation (2):

$$d'=m\lambda/|n_1(\lambda)-n_2(\lambda)| \quad (2)$$

where λ is the wavelength, m is the order of diffraction, $n_1(\lambda)$ is the refractive index of the base material, and $n_2(\lambda)$ is the refractive index of the protective coating material. If the right side of Equation (2) becomes constant in a certain wavelength range, the $m^{th}$-order diffraction efficiency no longer has wavelength dependence in that wavelength range. Such a condition is satisfied if the base and the protective coating are made of an appropriate combination of a high-refractive-index, high-Abbe-number material and a low-refractive-index, low-Abbe-number material. By making the base and the protective coating of such appropriate materials, the diffraction efficiency with respect to perpendicularly incident light can be 95% or more in the entire visible radiation range. It should be noted that in this configuration, the materials of the base and the protective coating could be changed with each other. Also, the height d' of the diffraction step of the diffraction grating portion becomes greater than the height d of the diffraction step of the diffraction grating portion with no protective coating to be calculated by Equation (1).

The diffractive lens shown in FIG. 11 produces only a few unnecessary diffracted rays other than the first-order one, and therefore, will hardly cause a flare that is a problem with the diffractive lens shown in FIG. 9. As a result, a good image can be produced with high resolution.

As can be seen, it is very effective to form the diffraction grating portion shown in FIG. 11 on the surface of an aspheric lens in order to produce an image with high resolution. In the following description, a diffractive lens to be used mainly for image capturing purposes will be referred to herein as a "diffractive imaging lens".

CITATION LIST

Patent Literature

Patent Document No. 1: Japanese Patent Application Laid-Open Publication No. 9-127321

SUMMARY OF INVENTION

Technical Problem

However, the present inventors discovered via experiments that the diffractive imaging lens shown in FIG. 11 has the following drawback.

Specifically, if the diffractive imaging lens shown in FIG. 11 is used as a camera lens with a small angle of view (such as a telephoto lens), the resultant image will be much sharper than what is obtained with the diffractive imaging lens shown in FIG. 9. On the other hand, if the diffractive imaging lens shown in FIG. 11 is used as a wide-angle lens for a camera, a flare will be produced in the resultant image and the contrast of the image will decrease significantly. On top of that, if a peripheral part of an image with a large angle of view darkens, the difference in brightness will be considerable between the center and peripheral parts of that image.

It is therefore an object of the present invention to provide a diffractive lens that can minimize such a flare by reducing unnecessary diffracted rays and that will keep the brightness high enough in the peripheral part even when used as a wide-angle lens and also provide an image capture device using such a lens.

Solution to Problem

A diffractive lens according to the present invention includes: a lens base, which has a surface with a diffraction grating; and a protective coating, which is arranged on the diffraction grating of the lens base. The diffraction grating has a first group of diffraction steps and a second group of diffraction steps, which is arranged farther away from the optical axis of the diffractive lens than the first group of diffraction steps is and which is lower in height than the first group of diffraction steps. One of the respective materials of the lens base and the protective coating has a higher refractive index and a greater Abbe number than the other material. The first group of diffraction steps is covered with the protective coating but the second group of diffraction steps is not covered with the protective coating.

In one preferred embodiment, the respective pitches of the first and second groups of diffraction steps decrease as the distance from the optical axis increases, and the second group of diffraction steps has a pitch of 30 μm or less.

In another preferred embodiment, there is a recess on the surface of the lens base, and the first group of diffraction steps is located inside of the recess and the second group of diffraction steps is located outside of the recess.

In still another preferred embodiment, the first and second groups of diffraction steps are arranged concentrically around the optical axis.

In yet another preferred embodiment, the lens base and the protective coating are made of resins, and inorganic particles are dispersed in at least one of the resins that make the lens base and the protective coating.

In this particular preferred embodiment, the protective coating is made of a photocurable resin in which at least one of particles of zirconium oxide, particles of yttrium oxide and particles of aluminum oxide are dispersed.

In yet another preferred embodiment, the farther away from the optical axis, the lower the first group of diffraction steps.

An image capture device according to the present invention includes: an optical system including a diffractive lens according to any of the preferred embodiments of the present invention described above; a solid-state image sensor for converting light that has come from a subject and has passed through the optical system into an electrical signal; and a computing circuit for producing a subject image based on the electrical signal supplied from the solid-state image sensor.

Advantageous Effects of Invention

According to the present invention, the first-order diffraction efficiency of light that has been incident on the second group of diffraction steps can be increased. That is why a light ray that is going to enter a lens at a relatively large angle of incidence can have increased first-order diffraction efficiency, and unnecessary diffracted light rays, other than the first-order one, can be reduced.

Consequently, an image capture device that uses the diffractive lens of the present invention as a wide-angle lens can minimize a flare that would otherwise be caused due to the presence of those unnecessary diffracted light rays, and can prevent the contrast of the resultant image from decreasing. On top of that, the incoming light with such a large angle of incidence will cause so little loss that a peripheral part of the image can be bright enough.

DESCRIPTION OF EMBODIMENTS

Hereinafter, preferred embodiments of a diffractive imaging lens and image capture device according to the present invention will be described with reference to the accompanying drawings. It should be noted, however, that the present invention is in no way limited to the specific preferred embodiments to be described below.

(Embodiments)

Figure 1:
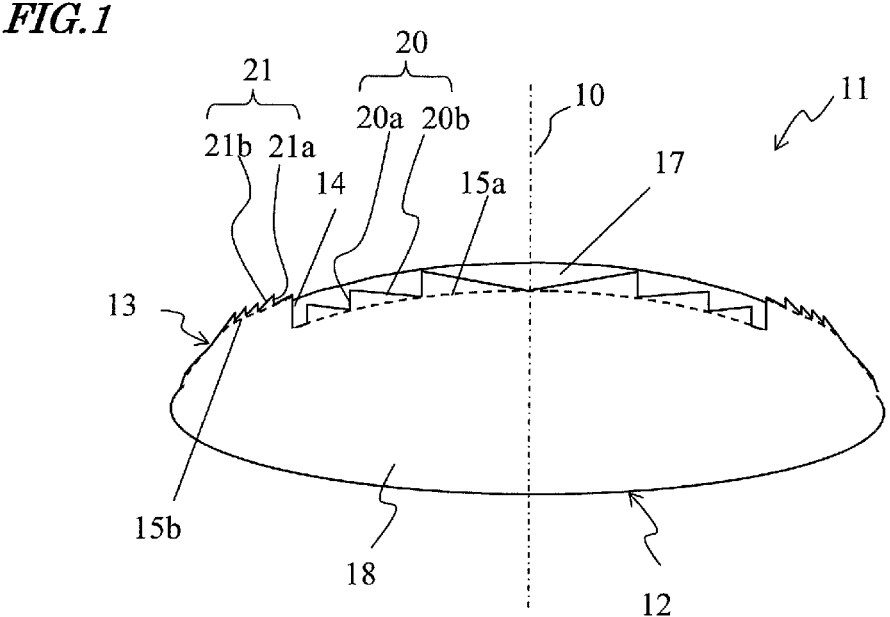
FIG. 1 is a cross-sectional view illustrating a diffractive imaging lens 11 as a specific preferred embodiment of the present invention.

FIG. 1 is a cross-sectional view illustrating a diffractive imaging lens 11 as a specific preferred embodiment of the present invention. The diffractive imaging lens 11 of this preferred embodiment includes a lens base 18 and a protective coating 17. The lens base 18 has first and second aspheric surfaces 12 and 13. The first surface 12 will face toward the subject, while the second surface 13 will face away from the subject (i.e., face toward the place where the incoming light is imaged). And the second surface 13 has first and second groups of diffraction grating portions 20 and 21 and each group has a concentric ring pattern in plan view. The second group of diffraction grating portions 21 is located farther away from the optical axis 10 than the first group of diffraction grating portions 20 is. The protective coating 17 does cover the first group of diffraction grating portions 20 but does not cover the second group of diffraction grating portions 21.

The first and second groups 20 and 21 each consists of a number of diffraction grating portions. Each diffraction grating portion 20 of the first group is comprised of a first surface (which is a diffractive step) 20a and a second surface 20b. The first surface 20a is arranged substantially parallel to the optical axis 10. On the other hand, the second surface 20b connects together the upper end of the first surface 20a of one diffraction grating portion 20 of the first group and the lower end of the first surface 20a of another diffraction grating portion 20 of the first group. The latter diffraction grating portion 20 is arranged inside of the former diffraction grating portion 20. The first surface 20a of each diffraction grating portion 20 of the first group forms a diffraction step on the second surface 13 of the diffractive imaging lens 11. And those diffraction steps are arranged concentrically around the optical axis.

In the same way, each diffraction grating portion 21 of the second group is also comprised of a first surface (which is a diffractive step) 21a and a second surface 21b. The first surface 21a is arranged substantially parallel to the optical axis 10. On the other hand, the second surface 21b connects together the upper end of the first surface 21a of one diffraction grating portion 21 of the second group and the lower end of the first surface 21a of another diffraction grating portion 21 of the second group. The latter diffraction grating portion 21 is arranged outside of the former diffraction grating portion 21. The second surface 20b of each diffraction grating portion 20 of the first group faces inward (i.e., toward the optical axis), whereas the second surface 21b of each diffraction grating portion 21 of the second group faces outward. The first surface 21a of each diffraction grating portion 21 of the second group forms a diffraction step on the second surface of the diffractive imaging lens 11. And those diffraction steps are arranged concentrically around the optical axis.

However, the diffraction steps of the first and second groups of diffraction grating portions 20 and 21 are not necessarily arranged concentrically. Alternatively, those concentric diffraction steps could be partially discontinued and have an arc shape.

Of two different materials for the diffractive imaging lens 11 and the protective coating 17, one material may have a higher refractive index and a larger Abbe number than the other. By using such a combination of materials with two different properties, d' that maximizes the first-order diffraction efficiency becomes substantially constant irrespective of the operating wavelength. For example, suppose the base 18 and the protective coating 17 need to be made of a material with the lower refractive index and the smaller Abbe number and a material with the higher refractive index and the larger Abbe number, respectively. In that case, the base 18 may be made of polycarbonate (with a d-line refractive index of 1.585 and an Abbe number of 27.9). On the other hand, the protective coating 17 may be made of an acrylic UV curable resin in which particles of zirconium oxide with a particle size of 10 nm are dispersed (with a d-line refractive index of 1.623 and an Abbe number of 40).

In this preferred embodiment, the diffraction steps of the diffraction grating portions 21 of the second group are lower in height than their counterparts of the diffraction grating portions 20 of the first group. Since the diffraction grating portions 20 of the first group are covered with the protective coating 17, their diffraction steps are represented by Equation (2), of which the denominator of the right side is obtained by subtracting the refractive index of the protective coating 17 from that of the base 18. On the other hand, the diffraction steps of the diffraction grating portions 21 of the second group, which are not covered with the protective coating 17, are represented by Equation (1), of which the denominator of the right side is obtained by subtracting the air refractive index of one from 1.585 that is the refractive index of the base 18. The protective coating 17 may be made of a resin, for example, and has a refractive index that is greater than one. For that reason, the denominator of the right side of Equation (2) becomes smaller than that of Equation (1). Consequently, the height d' of the diffraction steps calculated by Equation (2) is larger than the height d of the diffraction steps calculated by Equation (1).

Specifically, the diffraction grating portions 20 of the first group, which are covered with the protective coating 17, may have a diffraction step height of 14.9 μm, and Equation (2) is satisfies in that case. On the other hand, the diffraction grating portions 21a of the second group may have a diffraction step height of 0.9 μm. If the wavelength is 550 nm, the diffraction step height that makes the diffraction efficiency 100% is 0.93 μm according to Equation (1). In this case, however, the diffraction step height is set to be slightly smaller than 0.93 with the diffraction efficiency over the entire visible radiation range taken into consideration.

The diffraction grating portions 20 of the first group are arranged to form a first aspheric shape 15a of the second surface 13. On the other hand, the diffraction grating portions 21 of the second group are arranged to form a second aspheric shape 15b of the second surface 13.

The protective coating 17 has a substantially uniform thickness as measured parallel to the optical axis 10 and has been applied to reflect the curvature of the underlying aspheric shape 15b on the surface on the image capturing side.

It is preferred that the diffraction grating portions 20 and 21 be arranged in irregular pitches and that the farther away from the optical axis 10, the narrower the pitches. To increase understandability, the number, pitches, and relative sizes of the diffraction grating portions 20 and other lens shapes that are illustrated on the drawings are not exact ones.

Figure 2:
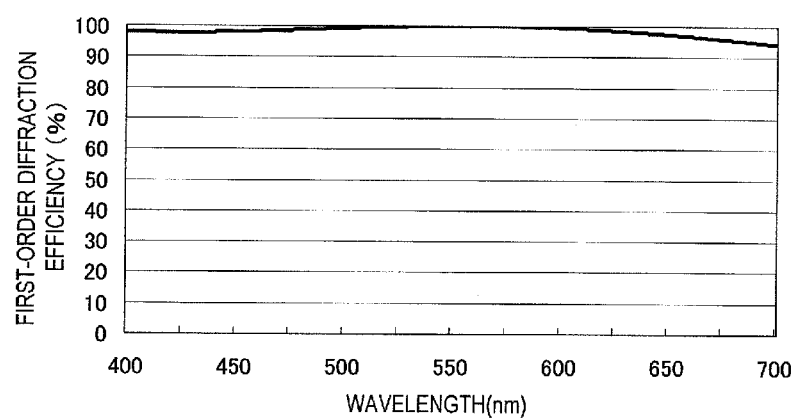
FIG. 2 shows the wavelength dependence of the first-order diffraction efficiency with respect to a light ray that has been incident perpendicularly onto the diffraction grating portions 20 of the first group.

The first-order diffraction efficiency with respect to a light ray that has been incident perpendicularly onto the diffraction grating portions 20 of the first group has the wavelength dependence shown in FIG. 2. As can be seen from FIG. 2, the first-order diffraction efficiency is 95% or more over the entire visible radiation range of 400 nm through 700 nm.

The surface shape of an aspheric lens can be represented by the following Equation (3):

$$z = \frac{ch^2}{1 + \sqrt{1-(K+1)c^2h^2}} + Ah^4 + Bh^6 + Ch^8 + Dh^{10} + Eh^{12} \quad (3)$$

$$(h^2 = x^2 + y^2)$$

This Equation (3) represents a cross-sectional shape on an x-y plane that intersects with the optical axis at right angles. The actual lens surface is obtained by rotating what is represented by Equation (3) on a z-axis (i.e., the optical axis) that intersects with the x-y plane at right angles. In Equation (3), c is a coefficient representing a central radius of curvature, and A, B, C, D and E are coefficients representing the degrees of deviation from a second-order curved surface. It should be enough to use these coefficients A through E. But coefficients of a higher order could be used or coefficients of a lower order could also be used. Also, according to the K value, the aspheric surface becomes one of the following surfaces:

if 0>K, an ellipsoid, of which the shorter diameter is the optical axis, if K=0, a sphere, if −1<K<0, an ellipsoid, of which the longer diameter is the optical axis, if K=−1, a paraboloid, and if K<−1, a hyperboloid In this preferred embodiment, the diffraction grating portions 20 of the first group are covered with the protective coating 17, and therefore, that part of the diffractive imaging lens with the diffraction grating portions 20 of the first group would exhibit a property as if the lens thickness were increased by the thickness of the protective coating 17. To avoid such a situation, that part with the diffraction grating portions 20 of the first group (i.e., the first aspheric shape 15a) preferably has a recess 14.

The diffraction grating portions 21 of the second group are arranged outside of the recess 14 on the second surface 13 of this diffractive imaging lens 11. Suppose the depth of the recess 14 (i.e., the height of the side surface of the recess 14) is S. In that case, by cutting the recess 14, the first aspheric shape 15a and the diffraction grating portions 20 of the first group become closer to the subject by that distance S than the second aspheric shape 15b and the diffraction grating portions 21 of the second group are, and the thickness of that part of the lens base 18 with the first aspheric shape 15a decreases by the depth S of the recess 14.

If the optical thickness of the protective coating 17 (i.e., the product of the thickness and refractive index of the protective coating) is equal to the product of the depth S of the recess 14 and the refractive index of the base 18, then the image capturing performance achieved would be similar to that of a lens that has the aspheric shape represented by Equation (3) continuously over the entire surface.

The thickness of the protective coating 17 needs to be greater than the diffraction step height d of the diffraction grating portions 20 of the first group. However, if the protective coating 17 were too thick, then the degree of close contact between the protective coating 17 and the lens base 18 might decrease as the case may be. For that reason, the protective coating 17 preferably has a thickness of 30 μm to 50 μm. If the protective coating 17 has a thickness of 30 μm, then the depth S of the recess 14 is preferably 30.7 μm because it is calculated by 30 μm×1.623/1.585. However, even if the depth of the recess 14 and the thickness of the protective coating 17 were both 30 μm, the image capturing performance of the lens would hardly deteriorate.

Also, the diffractive surface of the diffractive imaging lens 11 is designed by phase function method. According to a phase function method, a diffraction grating is supposed to be present on a lens surface and the wavefront is subjected, on that surface, to a phase transformation represented by the following Equations (4):

$$\phi(h) = \frac{2\pi}{\lambda} \psi(h) \quad (4)$$

$$\psi(h) = a_2 h^2 + a_4 h^4 + a_6 h^6 + a_8 h^8 + a_{10} h^{10}$$

$$(h^2 = x^2 + y^2)$$

The lens shape is eventually determined to be the sum of the aspheric shape and the group of diffraction grating portions as described above. In Equations (4), $\phi$ is a phase function, $\psi$ is an optical path function, h is a radial distance, and $a_2$, $a_4$, $a_6$, $a_8$ and $a_{10}$ are coefficients. It should be enough to use these coefficients $a_2$ through $a_{10}$. But coefficients of a higher order could be used or coefficients of a lower order could also be used. In any case, the order of diffraction is first-order in this example. The design wavelength λ may be the center value of the operating wavelength of the lens, for example.

In the actual manufacturing process, the SAG of a diffraction grating is determined by the difference in refractive index between the materials and the design wavelength using a phase function and a diffraction grating is formed on a surface with an aspheric shape. For example, when a phase function is used to transform diffraction grating portions, diffraction steps are sometimes provided on a 2 m π basis, where m is the order of diffraction. The shape of the diffraction grating portions is transformed with the sign of the phase function of Equations (4) changed depending on whether or not the refractive index of the base 18 is greater than that of the medium of the diffraction grating portions.

In this preferred embodiment, the diffraction grating portions 20 of the first group are in contact with the protective coating 17 and the base 18 has a lower refractive index than the protective coating 17. That is why the shape is transformed after the phase function represented by Equations (4) is multiplied by 1. On the other hand, the diffraction grating portions 21 of the second group are in contact with the air layer, and the base 18 has a higher refractive index than the air layer. Thus, the shape is transformed after the phase function represented by Equations (4) is multiplied by −1. Consequently, in the diffractive imaging lens 11 of this preferred embodiment shown in FIG. 1, the condensing power has a positive diffractive surface. In each of the diffraction grating portions 20 of the first group, the first surface 20a, which defines a diffraction step surface, is located closer to the outer periphery of the lens than the second surface 20b thereof is. On the other hand, in each of the diffraction grating portions 21 of the second group, the first surface 21a, which defines a diffraction step surface, is located closer to the optical axis 10 of the lens than the second surface 21b thereof is. If diffracted light, of which the order of diffraction is first-order, needs to be imaged, both of these first surfaces 20a and 21a (which are diffraction step surfaces) are provided on a 2π basis. The phase function is a phase distribution of the wavefront in the optical axis direction with respect to the distance r from the optical axis. And each of the first surfaces 20a and 21a (which are diffraction step surfaces) defined by the phase function becomes parallel to the optical axis. As shown in FIG. 1, in the blazed diffraction grating portions, the respective first surfaces 20a and 21a (which are diffraction step surfaces) are defined on the surfaces of the aspheric shapes 15a and 15b. And with those aspheric shapes 15a and 15b taken into account, the diffractive imaging lens is designed so that the first surfaces 20a and 21a are parallel to the optical axis.

The diffractive imaging lens of this preferred embodiment may have the following aspheric coefficients for the first surface 12 that is located closer to the subject and the following aspheric coefficients and phase coefficients for the second surface 13 that is located closer to the image sensor (where m is the order of diffraction):

Aspheric coefficients for first surface:
K=−0.796834A=−0.00670146,
B=0.0380988,
C=−0.0364111,
D=0.0132840, and
E=5.82320e−016
Aspheric coefficients for second surface:
K=3.749992,
A=0.0670042,
B=−0.0758092,
C=0.0621387,
D=−0152972, and
E=5.824155e−016
Phase coefficients for second surface:
m=1,
design wavelength λ=538 nm,
a2=−0.0256517,
a4=−0.0252208,
a6=0.0497239,
a8=−0.0376587, and
a10=0.00965820

Figure 3:
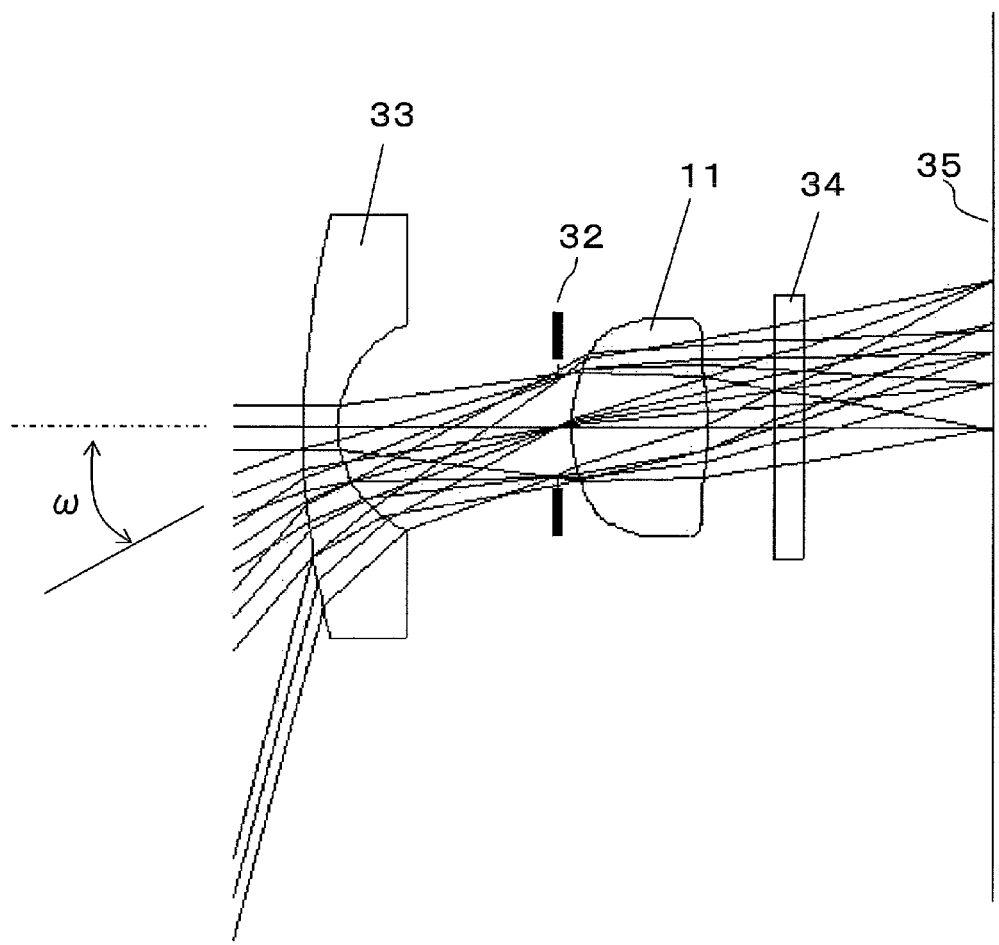
FIG. 3 illustrates an image capture device that uses the diffractive imaging lens 11 of the preferred embodiment shown in FIG. 1.

FIG. 3 illustrates an image capture device that uses the diffractive imaging lens 11 of the preferred embodiment shown in FIG. 1.

The image capture device of this preferred embodiment includes the diffractive imaging lens 11 and an imaging optical system, which is arranged closer to the subject than the diffractive imaging lens 11 is and which consists of two lenses including a convex lens 33 made of a glass material. A diaphragm 32 is further arranged closer to the subject than the diffractive imaging lens 11 is to receive the light that has come from the convex lens 33. In FIG. 3, the diffraction grating portions of the diffractive imaging lens 11 are not illustrated. On the other side of the diffractive imaging lens 11 opposite from the diaphragm 32 (or the subject, arranged are a cover glass plate 34 and a solid-state image sensor 35).

The following is some numerical data of the two-lens imaging optical system of this preferred embodiment:
Ω=150°,
Fno=2.8,
L=10.4 mm,
f=1.9004 mm and
h=2.25 mm

TABLE 1

| Surface # | R | T | nd | νd |
|---|---|---|---|---|
| 1 | 12.35704 | 0.519999 | 1.77250 | 49.62 |
| 2 | 1.686732 | 3.29229 | | |
| 3 (diaphragm) | Infinity | 0.241345 | | |
| 4 | 2.655821 | 2.047438 | 1.585000 | 27.9 |
| 5 | −4.63202 | 1.010682 | | |
| 6 | Infinity | 0.440999 | BK7 | |
| 7 | Infinity | 2.845853 | | | where Ω is the full angle of view, Fno is the F number, L is the optical length (i.e., the distance from the top of the subject side of a concave lens to the imaging plane), f is the focal length, h is the maximum image height, R is the radius of curvature [mm] of the surface, t is the surface-to-surface interval [mm] (i.e., the distance between the respective centers of the planes on the optical axis), nd is the d-line refractive index of the base, and ν is the d-line Abbe number of the base.

Surface #1, #2, #3, #4, #5, #6 and #7 represent the subject side of a concave lens, the imaging side of the concave lens, the diaphragm, the subject side of the diffractive imaging lens, the imaging side of the diffractive imaging lens, the subject side of the cover glass plate 34, and the imaging side of the cover glass plate 34, respectively. In the diffractive imaging lens 11 of this preferred embodiment, the first and second surfaces 12 and 13 correspond to Surfaces #4 and #5, respectively. The second surface 13 of this preferred embodiment (corresponding to Surface #5) has a recess 17 that smoothes out the thickness of the protective coating 17 and therefore functions as if it were the surface of a lens that has an aspheric shape over the entire imaging side thereof.

The effective focal length f was measured at a wavelength of 550 nm.

In the image capture device of this preferred embodiment, the light that has come from the subject enters the concave lens 33, which refracts the incoming light with its high refraction ability so that the light that has struck the lens 33 with a wide angle of view and a large angle of incidence has its steep angle with respect to the optical axis decreased. This concave lens 33 contributes to reducing the aberration of the overall lens system. Next, the light that has been refracted by the concave lens 33 is incident on the diffractive imaging lens 11 by way of the diaphragm 32. Thereafter, the light leaves the diffractive imaging lens 11, is transmitted through the cover glass plate 34, and then is observed as an image on the solid-state image sensor 35. Subsequently, an electrical signal is generated by the solid-state image sensor 35 and transformed into a subject image by a computing circuit (not shown).

To reduce the aberration produced by the lens, it is preferred that the light ray be incident on the lens surface with a smaller angle of incidence and a smaller angle of refraction. By adding a diffraction grating with positive power to the diffractive imaging lens 11, the chromatic aberration of the lens that has been produced by the refraction system can be compensated for.

The concave lens 33 is preferably a so-called "meniscus concave lens" with a convex subject side. This is because a meniscus concave lens 33 would reduce the angle of incidence of the incoming light that is going to strike the concave lens 33 with a wide angle of view and therefore should cut down the reflection loss at the surface. And to reduce the angle of incidence of the incoming light that has come with a wide angle of view, it is preferred that the concave lens 33 have high refraction ability (i.e., a high refractive index).

Figure 4:
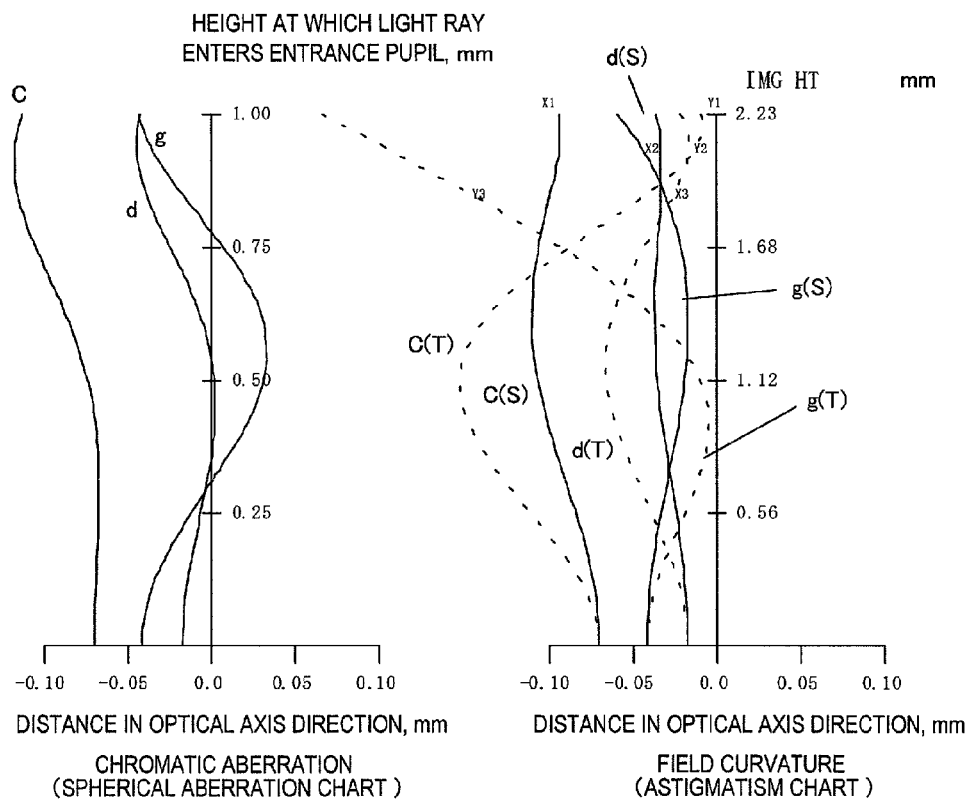
FIG. 4 shows the chromatic aberration and the magnitude of field curvature of the two-lens imaging optical system shown in FIG. 3.

FIG. 4 shows the chromatic aberration and the magnitude of field curvature of the two-lens imaging optical system of the image capture device shown in FIG. 3 as a spherical aberration chart and an astigmatism chart, respectively. In the spherical aberration chart, the abscissa represents the distance in the optical axis direction and the ordinate represents the height at which the light ray enters the entrance pupil, which plots the point of intersection between the light ray and the optical axis. In this chart, C represents a C-line (with a wavelength of 656.27 nm), d represents a d-line (with a wavelength of 587.56 nm) and g represents a g-line (with a wavelength of 435.83 nm). And the difference between their imaging points is the magnitude of axial chromatic aberration.

On the other hand, in the astigmatism chart, the abscissa represents the distance in the optical axis direction and the ordinate represents the image height. Therefore, the distance represented by the abscissa means the magnitude of field curvature at each image height. In this astigmatism chart, T and S represent a tangential and a sagital, which are indicated by the dotted curve and the solid curve, respectively.

As can be seen from the astigmatism chart shown in FIG. 4, the chromatic aberration could be compensated for even at a wide angle of view. To establish an optical system, of which the performance is comparable to the counterpart of this preferred embodiment, without using a diffractive imaging lens, at least three aspheric lenses should be used. That is why by introducing the diffractive imaging lens, the number of lenses to use can be reduced and the overall performance can be improved, too.

Next, the diffraction steps and the diffraction efficiency of the diffractive imaging lens 11 of this preferred embodiment will be described in detail. The total number of concentric diffraction steps on the second surface 13 of this diffractive imaging lens 11 is 91.

Figure 5:
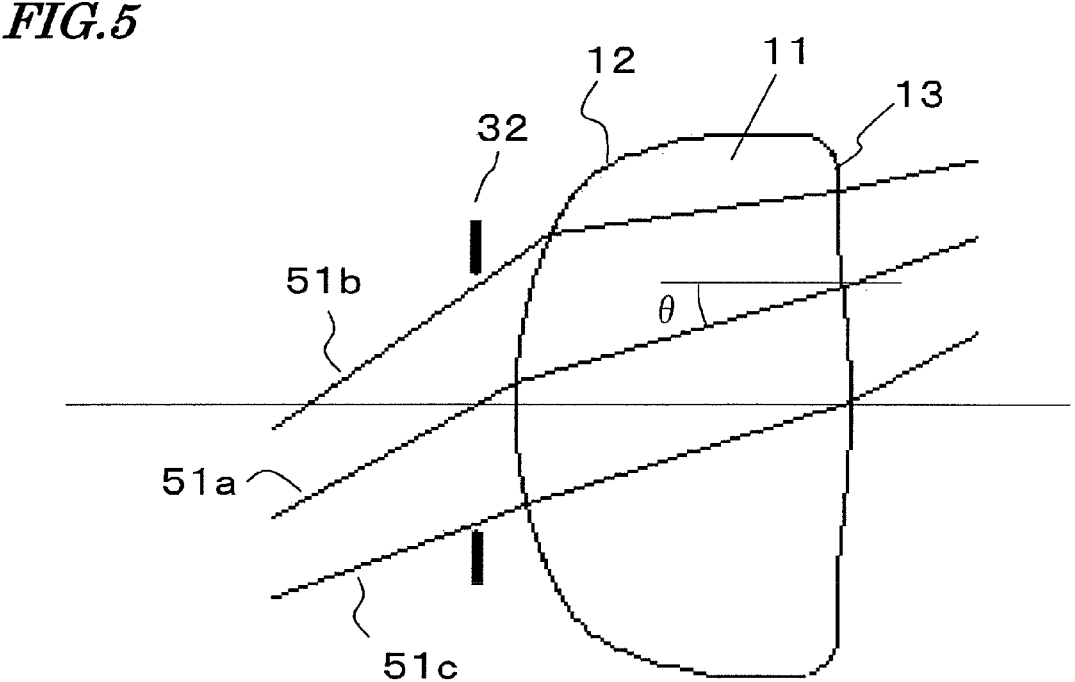
FIG. 5 illustrates a light ray that is passing through the diaphragm 32 and the diffractive imaging lens 11 in the image capture device shown in FIG. 3.

FIG. 5 illustrates a light ray that is passing through the diaphragm 32 and the diffractive imaging lens 11 in the image capture device shown in FIG. 3. In FIG. 5, the diffraction grating portions on the second surface 13 of the diffractive imaging lens 11 are not illustrated.

This optical system has an angle of view of 150 degrees. That is why the concave lens 33 shown in FIG. 3 receives light rays that define angles of −75 degree through 75 degree (i.e., a half angle of view ω) with respect to the optical axis and gets them imaged on the image sensor 35. In FIG. 5, paying attention to the light that is passing through the diaphragm 32, it can be seen that even the light rays that have been incident there with the same angle of view will define varying angles with respect to the optical axis depending on exactly where the light rays pass through the diaphragm 32. The light illustrated in FIG. 5 is incident on the concave lens at a half angle of view of 75 degrees. However, the light ray (i.e., the chief ray) 51a passing through the center of the diaphragm 32, the light ray 51b passing through the upper end of the diaphragm on the paper, and the light ray 51c passing through the lower end of the diaphragm on the paper define mutually different angles (of 28.9, 35.1 and 19.9 degrees, respectively) with respect to the optical axis 10 when passing through the diaphragm 32. Likewise, those light rays will define mutually different angles of incidence with respect to the first and second surfaces 12 and 13 of the diffractive imaging lens 11, too.

Next, the second surface 13 of the diffractive imaging lens 11 will be described. As shown in FIG. 1, on the second surface 13, two groups of diffraction grating portions 20 and 21 are arranged in a concentric ring pattern on the two aspheric shapes 15a and 15b, of which the boundary is defined by the side surface of the recess 17. The protective coating 17 covers only the first group of diffraction grating portions 20, which is located closer to the optical axis.

On the second surface 13 of the diffractive imaging lens 11, there are 91 diffraction steps (i.e., the respective first surfaces 20a and 21a of the diffractive imaging lens 11 shown in FIG. 1), which are arranged concentrically around the optical axis 10. These diffraction steps are numbered sequentially from the one that is located closest to the optical axis, and those numbers will be referred to herein as "diffraction step numbers". The following Table 2 shows the distance (mm) of each of those diffraction steps from the optical axis 10, its diffraction step pitch (μm), which is the interval between that diffraction step and the previous one, of which the diffraction step number is smaller by one than the former's, the smallest angle θ min defined with respect to the optical axis by one of the light rays that has been incident on the optical system with a half angle of view ω of −75 degrees through 75 degrees and that passes through that diffraction step, the half angle of view ω min of that light ray, the largest angle θ max defined by another one of those incoming light rays with respect to the optical axis, and the half angle of view ω max of that light ray. θ and ω are shown in FIGS. 5 and 3, respectively.

TABLE 2

| DIFFRACTION STEP NUMBER | DISTANCE (mm) FROM OPTICAL AXIS | DIFFRACTION STEP PITCH (μm) | SMALLEST ANGLE OF INCIDENCE θmin (deg) | HALF ANGLE OF VIEW ωmin (deg) FOR THAT ANGLE | LARGEST ANGLE OF INCIDENCE θmax (deg) | HALF ANGLE OF VIEW ωmax (deg) FOR THAT ANGLE | AVERAGE ANGLE OF INCIDENCE θave (deg) DEFINED |
|---|---|---|---|---|---|---|---|
| 1 | 0.1435 | 143.5 | −14 | −55 | 17 | 75 | 0 |
| 2 | 0.2012 | 57.7 | −13 | −50 | 17 | 75 | −0.5 |
| 3 | 0.2446 | 43.4 | −12 | −48 | 17 | 75 | −0.4 |
| 4 | 0.2806 | 36 | −12 | −45 | 17 | 75 | −0.8 |
| 5 | 0.3119 | 31.3 | −12 | −42 | 17 | 75 | −1.1 |
| 6 | 0.3398 | 27.9 | −11 | −39 | 17 | 75 | −1.2 |
| 7 | 0.3654 | 25.6 | −10 | −37 | 17 | 75 | −1.4 |
| 8 | 0.389 | 23.6 | −10 | −35 | 17 | 75 | −1.5 |
| 9 | 0.411 | 22 | −10 | −33 | 17 | 75 | −1.5 |
| 10 | 0.4318 | 20.8 | −9 | −31 | 17 | 75 | −1.5 |
| 11 | 0.4516 | 19.8 | −9 | −29 | 17 | 75 | −1.6 |
| 12 | 0.4704 | 18.8 | −8 | −27 | 17 | 75 | −1.6 |
| 13 | 0.4885 | 18.1 | −8 | −25 | 17 | 75 | −1.6 |
| 14 | 0.5059 | 17.4 | −8 | −24 | 17 | 75 | −1.6 |
| 15 | 0.5227 | 16.8 | −7 | −23 | 17 | 75 | −1.5 |
| 16 | 0.539 | 16.3 | −7 | −21 | 17 | 75 | −1.5 |
| 17 | 0.5548 | 15.8 | −7 | −20 | 17 | 75 | −1.4 |
| 18 | 0.5703 | 15.5 | −6 | −18 | 17 | 75 | −1.3 |
| 19 | 0.5854 | 15.1 | −6 | −17 | 17 | 75 | −1.3 |
| 20 | 0.6001 | 14.7 | −6 | −15 | 17 | 75 | −1.2 |
| 21 | 0.6146 | 14.5 | −6 | −14 | 17 | 75 | −1.1 |
| 22 | 0.6288 | 14.2 | −5 | −13 | 17 | 75 | −1 |
| 23 | 0.6427 | 13.9 | −5 | −12 | 17 | 75 | −1 |
| 24 | 0.6565 | 13.8 | −5 | −10 | 17 | 75 | −0.8 |
| 25 | 0.67 | 13.5 | −4 | −9 | 17 | 75 | −0.6 |
| 26 | 0.6833 | 13.3 | −4 | −8 | 17 | 75 | −0.5 |
| 27 | 0.6965 | 13.2 | −4 | −6 | 17 | 75 | −0.3 |
| 28 | 0.7095 | 13 | −3 | −5 | 17 | 75 | −0.1 |
| 29 | 0.7223 | 12.8 | −3 | −4 | 17 | 75 | 0.1 |
| 30 | 0.735 | 12.7 | −3 | −3 | 17 | 75 | 0.1 |

TABLE 2-continued

| DIFFRACTION STEP NUMBER | DISTANCE (mm) FROM OPTICAL AXIS | DIFFRACTION STEP PITCH (μm) | SMALLEST ANGLE OF INCIDENCE θmin (deg) | HALF ANGLE OF VIEW ωmin (deg) FOR THAT ANGLE | LARGEST ANGLE OF INCIDENCE θmax (deg) | HALF ANGLE OF VIEW ωmax (deg) FOR THAT ANGLE | AVERAGE ANGLE OF INCIDENCE θave (deg) DEFINED |
|---|---|---|---|---|---|---|---|
| 31 | 0.7476 | 12.6 | −3 | −1 | 17 | 75 | 0.2 |
| 32 | 0.76 | 12.4 | −2 | 1 | 16 | 75 | 0.5 |
| 33 | 0.7722 | 12.2 | −2 | 3 | 16 | 75 | 0.7 |
| 34 | 0.7844 | 12.2 | −2 | 3 | 16 | 75 | 0.8 |
| 35 | 0.7964 | 12 | −2 | 4 | 16 | 75 | 0.9 |
| 36 | 0.8083 | 11.9 | −1 | 5 | 16 | 75 | 1 |
| 37 | 0.8201 | 11.8 | −1 | 6 | 16 | 75 | 1.1 |
| 38 | 0.8317 | 11.6 | −1 | 8 | 16 | 75 | 1.3 |
| 39 | 0.8432 | 11.5 | −1 | 9 | 16 | 75 | 1.5 |
| 40 | 0.8546 | 11.4 | 0 | 10 | 15 | 75 | 1.6 |
| 41 | 0.8658 | 11.2 | 0 | 11 | 15 | 75 | 1.9 |
| 42 | 0.8769 | 11.1 | 0 | 12 | 15 | 75 | 1.9 |
| 43 | 0.8878 | 10.9 | 0 | 14 | 15 | 75 | 2.1 |
| 44 | 0.8986 | 10.8 | 1 | 14 | 15 | 75 | 2.3 |
| 45 | 0.9093 | 10.7 | 1 | 16 | 15 | 75 | 2.5 |
| 46 | 0.9198 | 10.5 | 1 | 17 | 15 | 75 | 2.7 |
| 47 | 0.9302 | 10.4 | 1 | 18 | 15 | 75 | 2.9 |
| 48 | 0.9404 | 10.2 | 2 | 19 | 14 | 75 | 2.9 |
| 49 | 0.9504 | 10 | 2 | 21 | 14 | 75 | 3.3 |
| 50 | 0.9603 | 9.9 | 2 | 22 | 14 | 75 | 3.3 |
| 51 | 0.9701 | 9.8 | 2 | 23 | 14 | 75 | 3.5 |
| 52 | 0.9797 | 9.6 | 2 | 23 | 14 | 75 | 3.5 |
| 53 | 0.9891 | 9.4 | 3 | 25 | 14 | 75 | 3.9 |
| 54 | 0.9984 | 9.3 | 3 | 26 | 14 | 75 | 4 |
| 55 | 1.0075 | 9.1 | 3 | 27 | 14 | 75 | 4.1 |
| 56 | 1.0165 | 9 | 3 | 28 | 13 | 75 | 4.3 |
| 57 | 1.0254 | 8.9 | 3 | 29 | 13 | 75 | 4.4 |
| 58 | 1.0341 | 8.7 | 4 | 31 | 13 | 75 | 4.6 |
| 59 | 1.0427 | 8.6 | 4 | 32 | 13 | 75 | 4.8 |
| 60 | 1.0512 | 8.5 | 4 | 33 | 13 | 75 | 4.9 |
| 61 | 1.0595 | 8.3 | 4 | 34 | 13 | 75 | 5 |
| 62 | 1.0677 | 8.2 | 4 | 35 | 13 | 75 | 5.2 |
| 63 | 1.0758 | 8.1 | 5 | 36 | 13 | 75 | 5.3 |
| 64 | 1.0838 | 8 | 5 | 37 | 12 | 75 | 5.5 |
| 65 | 1.0917 | 7.9 | 5 | 38 | 12 | 75 | 5.6 |
| 66 | 1.0995 | 7.8 | 5 | 39 | 12 | 75 | 5.7 |
| 67 | 1.1072 | 7.7 | 5 | 41 | 12 | 75 | 6 |
| 68 | 1.1148 | 7.6 | 5 | 42 | 12 | 75 | 6.1 |
| 69 | 1.1223 | 7.5 | 6 | 43 | 12 | 75 | 6.2 |
| 70 | 1.1297 | 7.4 | 6 | 43 | 12 | 75 | 6.3 |
| 71 | 1.1371 | 7.4 | 6 | 44 | 12 | 75 | 6.3 |
| 72 | 1.1445 | 7.4 | 6 | 46 | 11 | 75 | 6.6 |
| 73 | 1.1518 | 7.3 | 6 | 47 | 11 | 75 | 6.7 |
| 74 | 1.159 | 7.2 | 6 | 48 | 11 | 75 | 6.8 |
| 75 | 1.1662 | 7.2 | 6 | 48 | 11 | 75 | 6.9 |
| 76 | 1.1734 | 7.2 | 7 | 51 | 11 | 75 | 7.2 |
| 77 | 1.1806 | 7.2 | 7 | 52 | 11 | 75 | 7.3 |
| 78 | 1.1877 | 7.1 | 7 | 52 | 11 | 75 | 7.3 |
| 79 | 1.1949 | 7.2 | 7 | 54 | 11 | 75 | 7.5 |
| 80 | 1.2021 | 7.2 | 7 | 56 | 10 | 75 | 7.7 |
| 81 | 1.2093 | 7.2 | 7 | 57 | 10 | 75 | 7.8 |
| 82 | 1.2166 | 7.3 | 8 | 58 | 10 | 75 | 7.9 |
| 83 | 1.224 | 7.4 | 8 | 59 | 10 | 75 | 7.9 |
| 84 | 1.2315 | 7.5 | 8 | 62 | 10 | 75 | 8.3 |
| 85 | 1.2391 | 7.6 | 8 | 63 | 10 | 75 | 8.3 |
| 86 | 1.2468 | 7.7 | 8 | 64 | 10 | 75 | 8.3 |
| 87 | 1.2548 | 8 | 8 | 67 | 10 | 75 | 8.7 |
| 88 | 1.2631 | 8.3 | 9 | 68 | 9 | 75 | 8.7 |
| 89 | 1.2717 | 8.6 | 9 | 71 | 9 | 75 | 9 |
| 90 | 1.2808 | 9.1 | 9 | 73 | 9 | 75 | 9 |
| 91 | 1.2907 | 9.9 | 9 | 75 | 9 | 75 | 9 |

For example, diffraction step #10 is located at a distance (i.e., has a diffraction ring radius) of 0.4318 mm from the optical axis 10 and at an interval (i.e., has a diffraction step pitch) of 20.8 μm from the previous diffraction step #9. The light ray striking this diffraction step has an angle of incidence θ of −9 to 17 degrees. The half angle of view ω for a θ min of −9 degrees is −31 degrees. And the half angle of view ω for a θ max of 17 degrees is 75 degrees.

As can be seen, light rays with mutually different angles of incidence pass through the same diffraction step. In this description, the average angle of incidence θ ave is defined by the following Equation (5):

$$\theta ave = (\theta_{min} \times \cos^4 \omega_{min} + \theta_{max} \times \cos^4 \omega_{max} + (\theta_{min} + \theta_{max})/2 \times (\cos^4((\omega_{min} + \omega_{max})/2))/ (\cos^4 \omega_{min} + \cos^4 \omega_{max} + \cos^4 (\omega_{min} + \omega_{max})/2) \qquad (5)$$

Suppose there is a planar subject that intersects with the optical axis 10 at right angles and that has uniform brightness. In that case, the luminous flux of the light striking the entrance pupil of the lens is proportional to the fourth power of cos ω with respect to the half angle of view ω. That is to say, the greater the absolute value of the half angle of view ω of a light ray, the smaller the quantity of the light entering the lens. In view of this consideration, according to Equation (5), the average angle of incidence θ ave is defined by adding a weight of the fourth power of cos ω to the three half angles of view ω min, ω max and its average (ω min+ω max)/2.

This is based on the supposition that even if light rays actually strike the diffraction grating portions at multiple different angles of incidence, a diffractive imaging lens that would produce a minimum flare can still be obtained by replacing those rays with light rays that are incident with only their average angle θ ave and by determining a condition for achieving a high diffraction efficiency for that light ray.

The diffraction step #10 has a θ ave of −1.5 degrees, which means that the incoming light ray is substantially parallel to the optical axis. To obtain the diffraction efficiency in a situation where light rays are incident on the diffraction grating portions obliquely with respect to the optical axis, the present inventors carries out simulations by RCWA method, which is one of various electromagnetic field analysis methods, using the diffraction pitch as a parameter.

Figure 6:
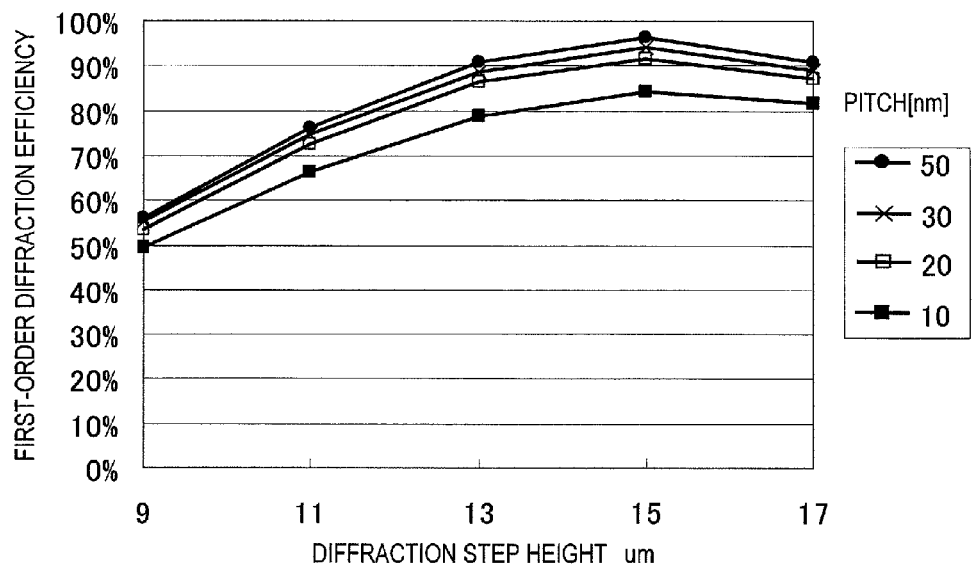
FIG. 6 shows the results of simulations that were carried out on a light ray that entered a diffractive imaging lens at an angle of incidence of 0 degrees to find how the first-order diffraction efficiency changed with the diffraction step height.
Figure 6:
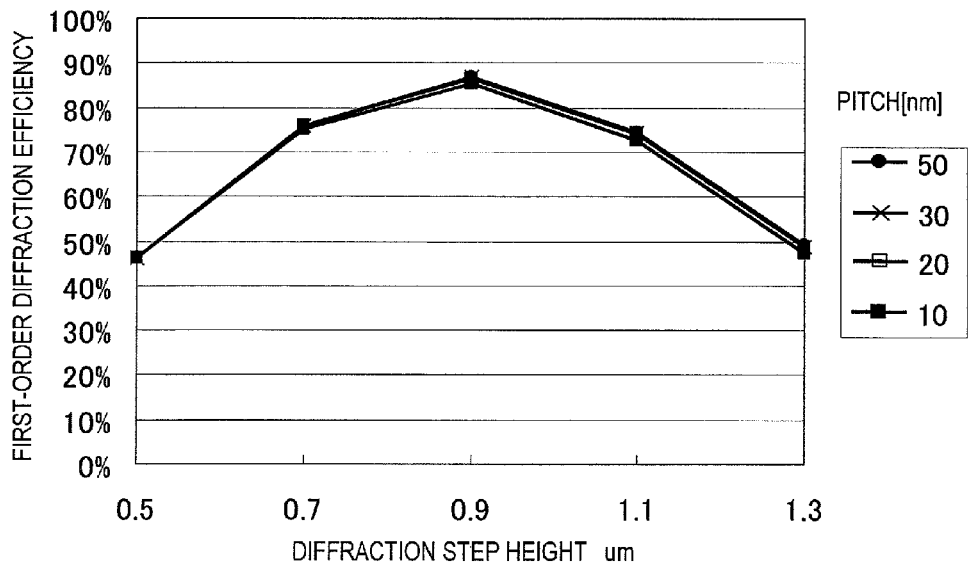

FIG. 6 illustrates two graphs showing the results obtained for a light ray with θ=0 degrees, i.e., a light ray that was incident on the diffraction step parallel to the optical axis. Specifically, FIG. 6(a) shows the results obtained by using an optical system with a protective coating covering the diffraction grating portions, while FIG. 6(a) shows the results obtained by using an optical system without a protective coating covering the diffraction grating portions. These simulations were carried out using diffraction grating portions made of polycarbonate (with a d-line refractive index of 1.585 and an Abbe number of 27.9) and a protective coating 17 made of an acrylic UV curable resin in which particles of zirconium oxide with a particle size of 10 nm or less were dispersed (and which had a d-line refractive index of 1.623 and an Abbe number of 40).

In FIGS. 6(a) and 6(b), the abscissa represents the height of the diffraction step, the ordinate represents the first-order diffraction efficiency, and results of simulations that were obtained with various diffraction pitches of 10, 20, 30 and 50 μm are shown. In this case, the first-order diffraction efficiency represented by the ordinate was calculated as a weighted average by adding a weight to the wavelength. Generally speaking, when a color image is generated by a solid-state image sensor, the light rays in the respective colors of red, green and blue will contribute to generating the image to mutually different degrees. Specifically, the luminance of a green ray usually contributes more significantly than any other light ray's does. Thus, in this example, the wavelength dependence of the first-order diffraction efficiency shown in FIG. 2 was determined, the diffraction efficiency was weighted to varying degrees according to how much the respective light rays would contribute to generating the image, and then the average first-order diffraction efficiency was calculated. Specific weights added to light rays with respective wavelengths of 656 nm, 589 nm, 546 nm, 480 nm and 405 nm were 1, 4, 7, 5 and 1, respectively.

As shown in FIG. 2, the optical system with the protective coating 17 always had as high diffraction efficiency as 90% or more irrespective of the wavelength (note that the results shown in FIG. 2 were obtained when the diffraction step height was 14.9 μm). As shown in FIG. 6(a), however, the smaller the pitch, the lower the first-order diffraction efficiency. As for the optical system without the protective coating, on the other hand, it can be seen from FIG. 6(b) that the first-order diffraction efficiency did depend on the diffraction step height but hardly depended on the pitch. And as can be seen from FIGS. 6(a) and 6(b), when the diffraction pitch was approximately 10 μm, the optical system with the protective coating 17 had a first-order diffraction efficiency of 50% to 85%. And this range is almost no different from that of the first-order diffraction efficiency of the optical system with no protective coating.

Figure 7:
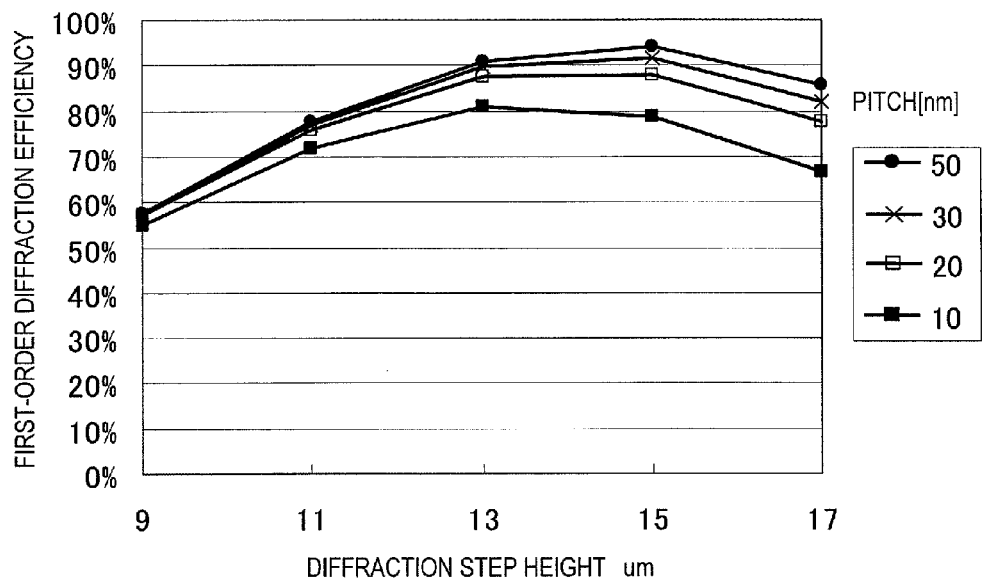
FIG. 7 shows the results of simulations that were carried out on a light ray that entered a diffractive imaging lens at an angle of incidence of 5 degrees to find how the first-order diffraction efficiency changed with the diffraction step height.
Figure 7:
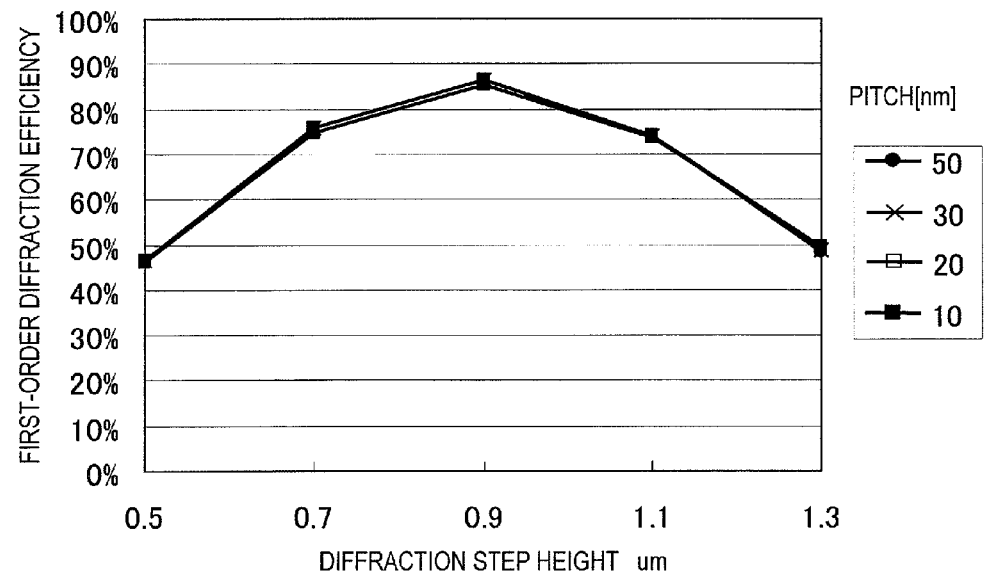
Figure 8:
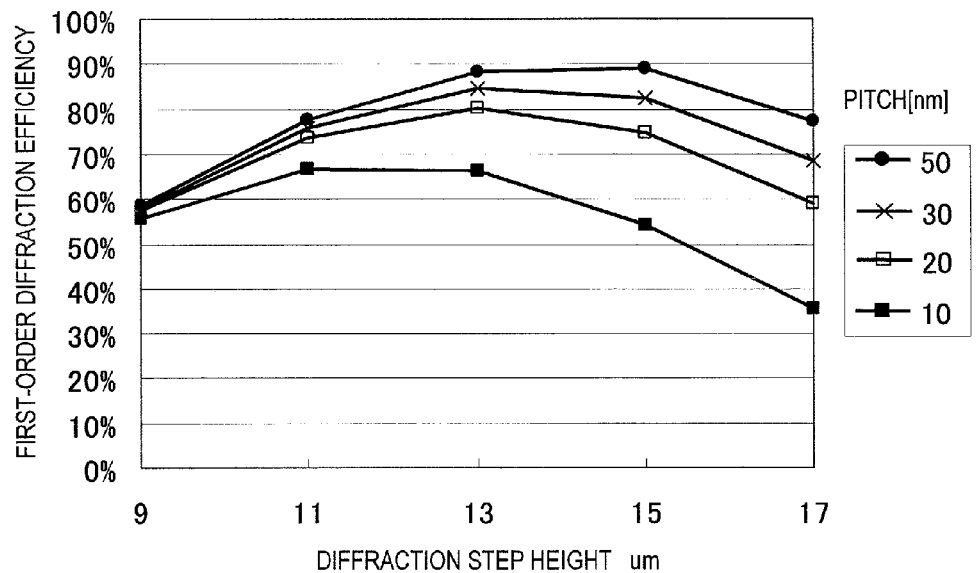
FIG. 8 shows the results of simulations that were carried out on a light ray that entered a diffractive imaging lens at an angle of incidence of 10 degrees to find how the first-order diffraction efficiency changed with the diffraction step height.
Figure 8:
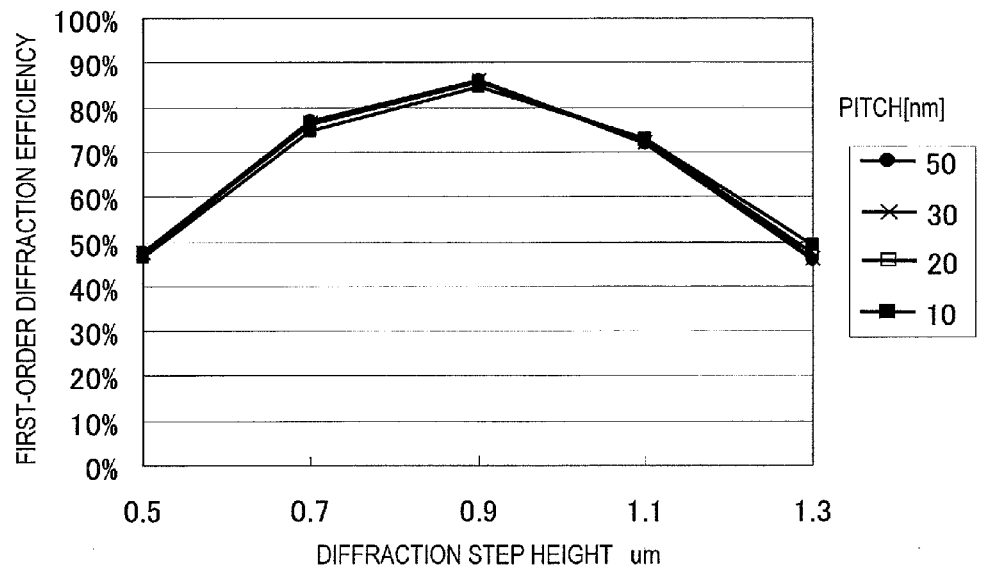
Figure 9:
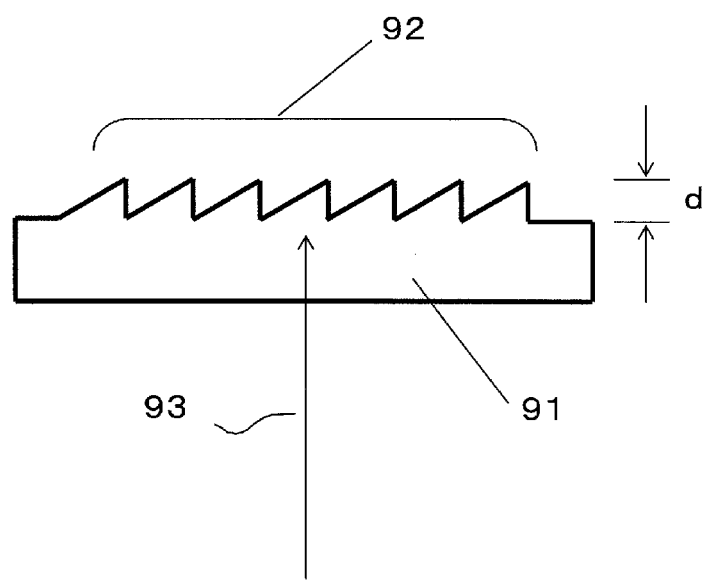
FIG. 9 illustrates a conventional diffraction grating portion.
Figure 10:
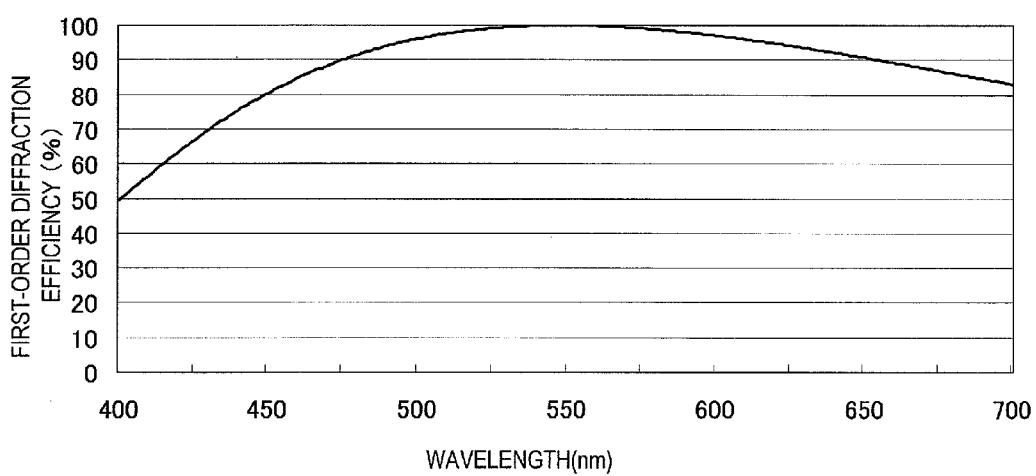
FIG. 10 is a graph showing the wavelength dependence of the first-order diffraction efficiency in a conventional diffraction grating.
Figure 11:
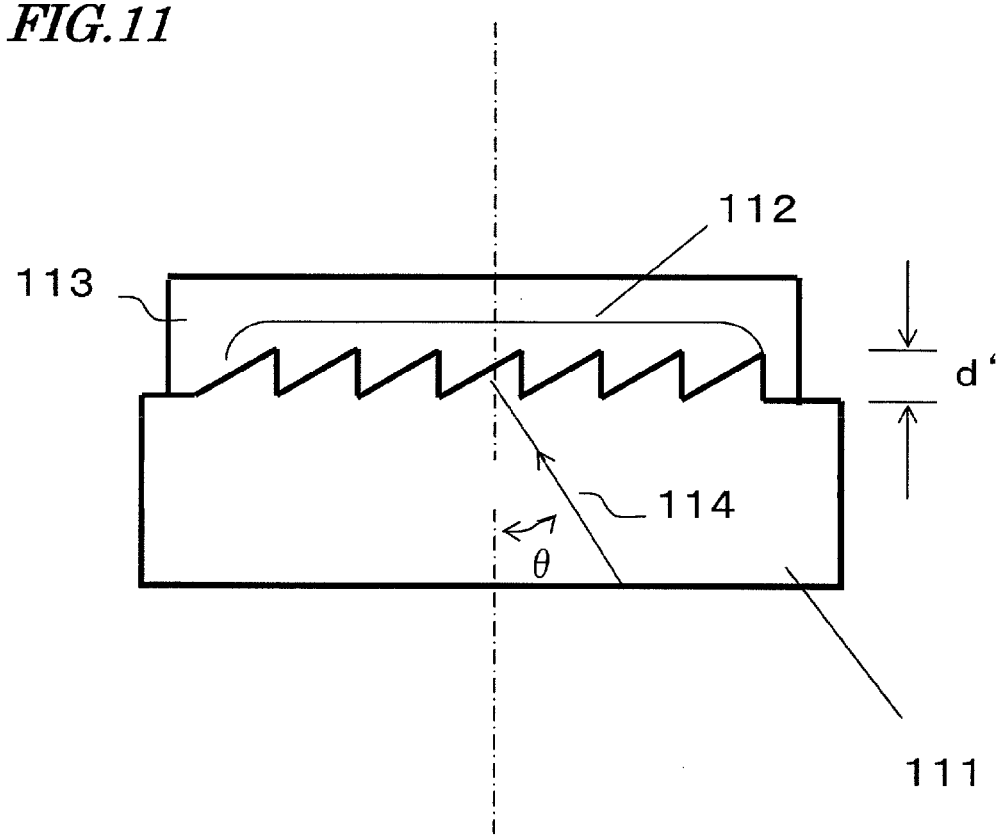
FIG. 11 illustrates a conventional diffraction grating portion covered with a protective coating.

FIGS. 7 and 8 show how the first-order diffraction efficiency varied with the diffraction step height when θ=5 degrees and when θ=10 degrees, respectively. As can be seen from FIGS. 7(b) and 8(b), the first-order diffraction efficiency of the optical system with no protective coating was almost no different from the situation where θ=0 degrees as shown in FIG. 6(b).

On the other hand, the peak value in the graph shown in FIG. 6(a) is higher than the peak at any pitch shown in FIG. 6(b). In the graph shown in FIG. 7(a), the peak value (of approximately 81%) of the curve for a pitch of 10 μm is smaller than the peak value (of approximately 85%) of the curve for the same pitch of 10 μm shown in FIG. 7(b). Likewise, in the graph shown in FIG. 8(a), the peak value (of approximately 67%) of the curve for a pitch of 10 μm is also smaller than the peak value (of approximately 85%) of the curve for the same pitch of 10 μm shown in FIG. 8(b). Furthermore, although the first-order diffraction efficiency represented by the curve for a pitch of 10 μm in the graph shown in FIG. 8(a) decreases to about 36% when the diffraction step height is 17 μm, the lowest first-order diffraction efficiency is approximately 48% in FIG. 8(b). As can be seen, the decrease in first-order diffraction efficiency is not so significant in FIG. 8(b) than in FIG. 8(a). The first-order diffraction efficiency will decrease steeply in this manner if a protective coating is provided for a diffraction grating on which a light ray is incident at a large angle. This is probably because with the protective coating provided, the diffraction step height should be increased so much that a greater quantity of light would cross that step and deviate from the originally designed optical path, and a smaller quantity of light would be diffracted with a desired angle of diffraction.

These results reveal that if θ is zero, the first-order diffraction efficiency will increase by covering the diffraction steps with the protective coating, irrespective of the pitch of the diffraction steps but that if θ is equal to or greater than 5 degrees, it depends on the pitch of the diffraction steps whether the steps should be covered with the protective coating or not. In FIGS. 7 and 8, if the pitch falls within the range of 15 μm to 30 μm, the first-order diffraction efficiency would be higher without the protective coating. On the other hand, if the pitch is equal to or greater than 50 μm, then the first-order diffraction efficiency would be higher with the protective coating.

The second group of diffraction grating portions 21 is arranged farther away from the optical axis 10 than the first group of diffraction grating portion 20 is, and therefore, the average angle of incidence of light rays that strike the second group of diffraction grating portions 21 is relatively large. Also, the farther away from the optical axis 10, the smaller the pitches of the first and second groups of diffraction grating portions 20 and 21. And the second group of diffraction grating portions 21 has a pitch of 30 μm or less. That is why the first-order diffraction efficiency would rather increase with no protective coating provided for the second group of diffraction grating portions 21.

As shown in Table 2, in the diffractive imaging lens 11 of this preferred embodiment, the average angle of incidence θ ave is 5 degrees or more from diffraction step #61 on, but the diffraction grating portions with diffraction steps #1 through #30 (i.e., every diffraction step that is located closer to the optical axis than diffraction step #30 is) are covered with the protective coating 17 in view of the diffraction pitch. Hereinafter, it will be described in detail why this arrangement is preferred. Look at Table 2, and you can see that the diffraction step #61 has a diffraction step pitch of 8.3 μm. In FIG. 7(a) showing the first-order diffraction efficiency in a situation where θ is 5 degrees, the curve for a pitch of 10 μm, which is closer to that pitch of 8.3 μm than any other pitch shown there, has a peak of first-order diffraction efficiency of approximately 80% when the diffraction step height is 13 μm. Since the actual pitch of 8.3 μm is smaller than 10 μm, the peak value should be even lower than 82%. On the other hand, in FIG. 7(b), the curve for a pitch of 10 μm has a peak of first-order diffraction efficiency of approximately 85% when the diffraction step height is 0.9 μm. In the graph shown in FIG. 7(b), the first-order diffraction efficiency has a similar behavior at any pitch, and therefore, the peak value would also be approximately 85% even if the pitch is 8.3 μm. This result reveals that the first-order diffraction efficiency of the diffraction grating portion with the diffraction step #61 should increase without the protective coating. In this manner, the present inventors determined whether the protective coating should or should not be provided for each of those diffraction steps to increase the first-order diffraction efficiency. And based on the results thus collected, no protective coating is provided according to this preferred embodiment for the diffraction grating portions with diffraction steps #31 through #61.

The diffraction steps #1 through #30 have a height of 14.9 μm, while the diffraction steps #31 and on have a height of 0.9 μm, at which the highest diffraction efficiency is achieved as shown in FIG. 7(b).

Optionally, in this preferred embodiment, the farther away from the optical axis, the lower the diffraction step height of the first group of diffraction grating portions 20 may be. For example, the first group of diffraction grating portions 20 may have a diffraction step height that falls within the range of 13 μm to 14.9 μm and that decreases gradually outward (i.e., as the distance from the optical axis increases). Look at the curves for a pitch of 20 μm shown in FIGS. 6(a), 7(a) and 8(a), for example, and it can be seen that the diffraction step heights associated with the peak of the first-order diffraction efficiency are 15 μm, 13-15 μm and 13 μm, respectively. These results reveal that the larger the angle of incidence of the incoming light, the lower the height of the diffraction step associated with the peak of the first-order diffraction efficiency. The average angle of incidence of the light rays that strike the first group of diffraction grating portions 20 increases as the distance from the optical axis increases. That is why if the heights of the diffraction steps of the first group of diffraction grating portions 20 are decreased as the distance from the optical axis increases, then high first-order diffraction efficiency will be achieved at each of those diffraction grating portions 20 of the first group.

Likewise, the diffraction steps of the second group of diffraction grating portions 21 may also have their height decreased as the distance from the optical axis increases.

In the preferred embodiment described above, the first group of diffraction grating portions 20 is covered with the protective coating 17, while the second group of diffraction grating portions 21 is not covered with the protective coating 17 but just exposed to the air. Thus, the first-order diffraction efficiency can be increased even in the second group of diffraction grating portions 21 and unwanted diffracted rays other than the first-order ones can be reduced. In this manner, the first-order diffraction efficiency of light rays that strike the lens at relatively large angles of incidence can be increased. That is why even if this diffractive imaging lens 11 is used as a wide-angle lens, a flare that would otherwise be caused due to the presence of those unwanted diffracted rays can be minimized and the decrease in the contrast of the image can be avoided. What's more, since the light that enters the lens at a large angle of incidence will be lost only a little, the peripheral portion of the image can be bright enough.

The image capture device of the preferred embodiment shown in FIG. 3 can produce a color image, of which the resolution is high in a rather broad range, using only two lenses. Thus, the image capture device of this preferred embodiment can reduce the minimum required number of lenses to use compared to conventional ones, and therefore, can have a smaller size and thickness than its counterparts. In addition, the process of positioning and aligning the respective lenses can be simplified, thus achieving higher productivity while cutting down the costs. Consequently, the image capture device of the present invention can be used particularly effectively as a car camera, a surveillance camera, a medical device camera, or a cellphone camera, to name just a few.

It should be noted that the diffractive imaging lens of the present invention does not have to use the particular lens shape or lens material of the diffractive imaging lens 11 of the preferred embodiment described above.

In the preferred embodiment described above, the base 18 is supposed to be made of polycarbonate and the protective coating 17 is supposed to be made of an acrylic UV curable resin in which particles of zirconium oxide are dispersed. However, the base 18 and the protective coating 17 do not always have to be made of these materials but may also be made of glass materials, for example. Nevertheless, considering productivity and cost benefits, it is still preferred that both the lens base 18 and the protective coating 17 be made of resin-based materials. Among other things, a thermoplastic resin is particularly preferred as a material for the lens base because high productivity should be achieved in that case.

And it is especially preferred that a thermoplastic resin (such as an acrylic UV curable resin), which has a low refractive index and a low Abbe number, be used to make the lens base 18 and a resin material in which inorganic particles such as particles of zirconium oxide are dispersed be used as a high-refractive-index, high-Abbe-number material to make the protective coating 17. By using a photocurable resin such as a UV curable rein, the material can be formed in any surface shape by either coating process or molding process. As a result, the protective coating can be formed easily. Also, the inorganic particles to disperse are preferably a colorless and transparent oxide material. Among other things, to realize a high-refractive-index, high-Abbe-number protective coating, an inorganic material with a high refractive index and a high Abbe number is needed. Examples of such inorganic materials include yttrium oxide and aluminum oxide as well as zirconium oxide. All of these three are particularly effective. And any of these oxides may be used either by itself or in combination.

If a high-refractive-index, high-Abbe-number material is used to make the lens base 18 and if a low-refractive-index, low-Abbe-number material is used to make the protective coating 17, then the first and second groups of diffraction grating portions 20 and 21 are preferably arranged so that their respective second surfaces 20b and 21b both tilt outward and their respective first surfaces 20a and 21a both tilt inward (i.e., toward the optical axis).

The first group of diffraction grating portions 20 is arranged along the first aspheric shape 15a of the recess 14 in the preferred embodiment described above, but may also be arranged along the second aspheric shape 15b thereof. Optionally, the first group of diffraction grating portions 20 could be formed to protrude from the second surface 13.

Also, the diffractive imaging lens 11 of the preferred embodiment described above is used as one of the two lenses that form the imaging optical system. However, if an appropriate lens shape or diffraction grating shape is selected, the present invention is also applicable for use even in an image capture device that uses either only one lens or three or more lenses in combination.

If necessary, the surface of the diffractive imaging lens 11 of the preferred embodiment described above may be covered with an antireflective coating. Furthermore, the operating wavelength is supposed to fall within the visible radiation wavelength range of 400 nm to 700 nm in the preferred embodiment described above. However, the present invention is in no way limited to that specific preferred embodiment. Optionally, another group of diffraction grating portions could be provided for the first surface 12 of the diffractive imaging lens 11 of this preferred embodiment, too.

Furthermore, in the preferred embodiment described above, the average angle of incidence θ ave on the respective diffraction steps of the second surface 13 of the diffractive imaging lens 11 is supposed to be calculated by Equation (5). However, the weight could be changed by using intermediate angles of incidence as well.

COMPARATIVE EXAMPLE 1

As Comparative Example #1, made was a diffractive imaging lens having neither the recess 14 nor the protective coating 17 shown in FIG. 1 but including diffraction grating portions in the same shape as the diffraction grating portions 20 shown in FIG. 1 over the entire second surface (i.e., the side facing the image capture device). The height of the diffraction steps was set to be 0.9 μm. The diffractive imaging lens of this Comparative Example #1 had quite the same aspheric coefficient on the first surface (i.e., the side facing the subject) and the same aspheric and phase coefficients on the second surface as the counterpart 11 of the preferred embodiment described above. The image produced by using the diffractive imaging lens of this Comparative Example #1 instead of the diffractive imaging lens 11 shown in FIG. 3 was evaluated. As a result, a noticeable flare and a decrease in resolution were seen around the center of the image.

A portion of an image around its center consists of light rays with a small half angle of view ω. As described above, the luminous flux of light striking the entrance pupil of a lens is proportional to the fourth power of cos ω. That is why a light ray with a small half angle of view ω contributes much more greatly to producing an image than a light ray with a large half angle of view ω. Such a light ray with a small half angle of view ω strikes the diffraction grating portions at a relatively small angle of incidence θ. That is why looking at FIG. 6(*b*) showing the first-order diffraction efficiency in a situation where θ=0 degrees, it can be seen that the diffraction grating portions with no protective coating had a maximum first-order diffraction efficiency of approximately 85% and the remaining 15% was unnecessary diffracted light. Such a noticeable flare was observed with the diffractive imaging lens of Comparative Example #1 because the half angle of view ω was so small that 15% of light rays that contributed very much to producing the image would have been superposed as unnecessary diffracted light rays on the image.

COMPARATIVE EXAMPLE 2

As Comparative Example #2, made was a diffractive imaging lens not having the recess 14 shown in FIG. 1 but including diffraction grating portions and protective coating in the same shapes as the diffraction grating portions 20 and protective coating 17 shown in FIG. 1 over the entire second surface (i.e., the side facing the image capture device). The height of the diffraction steps was set to be 14.9 μm. The materials of the protective coating and diffraction grating portions of the diffractive imaging lens of this Comparative Example #2 were the same as what was used to make the diffractive imaging lens 11 of the preferred embodiment described above. The diffractive imaging lens of this Comparative Example #2 had quite the same aspheric coefficient on the first surface (i.e., the side facing the subject) and the same aspheric and phase coefficients on the second surface as the counterpart of the preferred embodiment described above. The image produced by using the diffractive imaging lens of this Comparative Example #2 instead of the diffractive imaging lens 11 shown in FIG. 3 was evaluated. As a result, the brightness was significantly different between central and peripheral portions of the image and the peripheral portion of the image with a large angle of view was rather dark. In addition, a noticeable flare and a decrease in resolution were also seen in the peripheral portion of the image.

A peripheral portion of an image consists of light rays, of which the absolute value of the half angle of view ω is large. Such light rays, of which the half angle of view ω has a great absolute value, will usually strike the diffraction grating portions at an angle of incidence θ with a relatively large absolute value. Among other things, steps with large diffraction step numbers in Table 2 have so small diffraction pitches that their first-order diffraction efficiency decreases as can be seen from FIGS. 7(*a*) and 8(*a*). Refraction of light that crosses high diffraction steps, as well as production of non-first-order diffracted light (i.e., diffracted light rays of unnecessary orders), would not contribute to imaging but would cause loss or stray light. Probably for that reason, a significant difference would have been caused between the central and peripheral portions of the image, the peripheral portion of the image with a large angle of view would have darkened, and a noticeable flare would have been produced in the peripheral portion of the image.

INDUSTRIAL APPLICABILITY

The diffractive imaging lens of the present invention can form an optical system of a small number of lenses, and therefore, contributes to size reduction effectively. In addition, the lens of the present invention has a high resolution, can be used to capture an image with a bright peripheral portion in a wide range, and therefore, can be used effectively to make an image capture device. The image capture device of the present invention can be used effectively as a car camera, a surveillance camera, a medical device camera or a cellphone camera, to name just a few.

REFERENCE SIGNS LIST 10 optical axis
11 diffractive imaging lens
12 first surface
13 second surface
14 recess
15a, 15b aspheric shape
17 protective coating
18 lens base
20, 21 diffraction grating portion
20a, 21a first surface
20b, 21b second surface
32 diaphragm
33 concave lens
34 cover glass plate
35 solid-state image sensor
51a chief ray with half angle of view of 75 degrees
51b light ray having half angle of view of 75 degrees and passing through upper end of diaphragm on the paper
51c light ray having half angle of view of 75 degrees and passing through lower end of diaphragm on the paper

The invention claimed is:

1. A diffractive lens comprising:
   a lens base, which has a surface with a diffraction grating; and
   a protective coating, which is arranged on the diffraction grating of the lens base,
   wherein the diffraction grating has a first group of diffraction steps and a second group of diffraction steps, which is arranged farther away from an optical axis of the diffractive lens than the first group of diffraction steps is and which is lower in height than the first group of diffraction steps,
   wherein the lens base comprises a first material and the protective coating comprises a second material, wherein each of the first material and the second material has a corresponding Abbe number and a refractive index, wherein both the Abbe number and the refractive index of the first material are greater than or less than the respective Abbe number and the refractive index of the second material, and
   wherein the first group of diffraction steps is covered with the protective coating but the second group of diffraction steps is not covered with the protective coating.

2. The diffractive lens of claim 1, wherein the first and second groups of diffraction steps each comprise pitches, wherein said pitches decrease as distance from the optical axis increases, and wherein the pitches of the second group of diffraction steps are 30 μm or less.

3. The diffractive lens of claim 1, wherein there is a recess on the surface of the lens base, and
   wherein the first group of diffraction steps is located inside of the recess and the second group of diffraction steps is located outside of the recess.

4. The diffractive lens of claims 1, wherein the first and second groups of diffraction steps are arranged concentrically around the optical axis.

5. The diffractive lens of claims 1, wherein the lens base and the protective coating are made of resins, and
   wherein inorganic particles are dispersed in at least one of the resins that make the lens base and the protective coating.

6. The diffractive lens of claim 5, wherein the protective coating is made of a photocurable resin in which at least one of particles of zirconium oxide, particles of yttrium oxide and particles of aluminum oxide are dispersed.

7. The diffractive lens of claim 1, wherein the farther away from the optical axis, the lower the first group of diffraction steps.

8. An image capture device comprising:
   an optical system including the diffractive lens of claim 1;
   a solid-state image sensor for converting light that has come from a subject and has passed through the optical system into an electrical signal; and
   a computing circuit for producing a subject image based on the electrical signal supplied from the solid-state image sensor.

* * * * *